United States Patent
Owens, Jr. et al.

(10) Patent No.: US 8,030,881 B2
(45) Date of Patent: Oct. 4, 2011

(54) BATTERY CONTROL SYSTEM AND METHOD

(75) Inventors: C. Richard Owens, Jr., Powell, OH (US); Nick Scheufler, Dublin, OH (US); John Sgueglia, Columbus, OH (US); Toshihiro Okama, Tochigi (JP); Tadashi Fujiwara, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 890 days.

(21) Appl. No.: 12/017,891

(22) Filed: Jan. 22, 2008

(65) Prior Publication Data

US 2009/0184686 A1    Jul. 23, 2009

(51) Int. Cl.
*H02J 7/00* (2006.01)
*H02J 7/14* (2006.01)

(52) U.S. Cl. ......... 320/104; 307/9.1; 307/10.1; 180/277

(58) Field of Classification Search .................. 320/104; 307/9.1, 10.1; 180/277
See application file for complete search history.

(56) References Cited

U.S. PATENT DOCUMENTS

| | | |
|---|---|---|
| 3,820,009 A | 6/1974 | Itoh et al. |
| 3,876,931 A | 4/1975 | Godshalk |
| 4,137,557 A | 1/1979 | Ciarniello et al. |
| 4,390,828 A | 6/1983 | Converse et al. |
| 4,396,880 A | 8/1983 | Windebank |
| 4,424,477 A | 1/1984 | Enoshima et al. |
| 4,527,112 A | 7/1985 | Herman |
| 4,766,862 A | 8/1988 | Hibino et al. |
| 4,848,700 A | 7/1989 | Lockheed |
| 4,852,540 A | 8/1989 | Safranek |
| 4,902,956 A | 2/1990 | Sloan |
| 5,087,869 A | 2/1992 | Kuriyama et al. |
| 5,204,992 A | 4/1993 | Carpenter |
| 5,214,385 A | 5/1993 | Gabriel et al. |
| 5,235,946 A | 8/1993 | Fodale et al. |
| 5,272,380 A | 12/1993 | Clokie |
| 5,280,232 A | 1/1994 | Kohl et al. |

(Continued)

FOREIGN PATENT DOCUMENTS

WO    WO 96/11817    4/1996

OTHER PUBLICATIONS

PCT International Search Report, Mar. 13, 2009.

*Primary Examiner* — Edward Tso
*Assistant Examiner* — Samuel Berhanu
(74) *Attorney, Agent, or Firm* — Mark E. Duell; Rankin Hill & Clark LLP

(57) ABSTRACT

A battery control system and method for a battery of a vehicle includes a battery for supplying electrical power to a plurality of loads of the vehicle and a controller that receives a battery signal representative of a condition of the battery, an ignition key signal representative of a state of an ignition key of the vehicle, and an engine signal representative of a state of an engine in the vehicle. The controller selectively electrically connects/disconnects the plurality of loads of the vehicle and the battery based on at least one of the battery signal, the ignition key signal, and the engine signal. An interface provides information on at least one of the battery and a connection state between the plurality of loads and the battery.

20 Claims, 5 Drawing Sheets

U.S. PATENT DOCUMENTS

| | | |
|---|---|---|
| 5,293,076 A | 3/1994 | Fukui |
| 5,295,078 A | 3/1994 | Stich et al. |
| 5,298,797 A | 3/1994 | Redl |
| 5,300,874 A | 4/1994 | Shimamoto et al. |
| 5,332,958 A | 7/1994 | Sloan |
| 5,343,137 A | 8/1994 | Kitaoka et al. |
| 5,385,126 A | 1/1995 | Matthews |
| 5,444,378 A | 8/1995 | Rogers |
| 5,450,321 A | 9/1995 | Crane |
| 5,602,462 A | 2/1997 | Stich et al. |
| 5,621,298 A | 4/1997 | Harvey |
| 5,668,465 A | 9/1997 | May |
| 5,684,370 A | 11/1997 | Watanabe |
| 5,691,619 A | 11/1997 | Vingsbo |
| 5,693,986 A | 12/1997 | Vettraino, Jr. et al. |
| 5,699,050 A | 12/1997 | Kanazawa |
| 5,717,937 A | 2/1998 | Fritz |
| 5,764,469 A | 6/1998 | Slepian et al. |
| 5,793,359 A | 8/1998 | Ushikubo |
| 5,798,577 A | 8/1998 | Lesesky et al. |
| 5,831,411 A | 11/1998 | Klauer et al. |
| 5,872,443 A | 2/1999 | Williamson |
| 5,896,023 A | 4/1999 | Richter |
| 6,066,899 A | 5/2000 | Rund et al. |
| 6,081,098 A | 6/2000 | Bertness et al. |
| 6,313,608 B1 | 11/2001 | Varghese et al. |
| 6,316,914 B1 | 11/2001 | Bertness |
| 6,331,762 B1 | 12/2001 | Bertness |
| 6,515,456 B1 | 2/2003 | Mixon |
| 6,700,386 B2 | 3/2004 | Egami |
| 6,759,760 B2 | 7/2004 | Gaynier et al. |
| 6,806,588 B2 | 10/2004 | Amano et al. |
| 6,836,718 B2 | 12/2004 | Hasfjord et al. |
| 6,871,151 B2 | 3/2005 | Bertness |
| 7,003,411 B2 | 2/2006 | Bertness |
| 7,116,078 B2 | 10/2006 | Colombo et al. |
| 7,126,341 B2 | 10/2006 | Bertness et al. |
| 7,146,959 B2 | 12/2006 | Thompson et al. |
| 7,173,347 B2 | 2/2007 | Tani et al. |
| 2003/0236599 A1 | 12/2003 | Saito et al. |
| 2004/0189254 A1 | 9/2004 | Kapsokavathis et al. |
| 2004/0232769 A1 * | 11/2004 | Pickering .................. 307/10.1 |
| 2004/0263176 A1 | 12/2004 | Vonderhaar et al. |
| 2005/0024061 A1 | 2/2005 | Cox et al. |
| 2005/0068039 A1 | 3/2005 | Bertness |
| 2005/0162172 A1 | 7/2005 | Bertness |
| 2005/0285445 A1 | 12/2005 | Wruck et al. |
| 2006/0214508 A1 | 9/2006 | Binder |
| 2006/0282227 A1 | 12/2006 | Bertness |
| 2007/0069734 A1 | 3/2007 | Bertness |
| 2007/0159177 A1 | 7/2007 | Bertness et al. |

* cited by examiner

BATTERY CONTROL SYSTEM AND METHOD

BACKGROUND

The present disclosure generally relates to battery control systems and methods for vehicles, and particularly relates to a battery control system and method for a vehicle having an engine (e.g., an internal combustion engine).

New vehicle models continue to be responsive to consumer demands for an ever increasing number of electrically powered features and devices. These features and devices add an additional burden to the vehicle's battery and thus more consideration is needed for maintaining the battery. Examples of such features and devices are memories for preferred positions of electrically adjustable devices, such as seats and mirrors, and memories for other electrically powered devices, such as radios having tuning presets. Still other examples include clocks, user specified navigational information, etc. The foregoing examples of features and devices that tax the vehicle's battery are normally of the type that cannot be manually isolated from the vehicle's battery by the driver. In addition to these, electrical components and devices of a vehicle can be inadvertently left on when their use is no longer desired and/or the vehicle is unattended. Obviously, this can further stress a vehicle's battery.

When a battery is overly discharged (such as by powering too many devices and features and/or inadvertently powering a device for an extended period without being recharged), the battery may no longer hold sufficient charge such as may be necessary, for example, for starting an internal combustion engine of a vehicle, if so equipped. Moreover, as the battery ages, it may become more susceptible to such over discharging, as vehicle batteries are known to degrade over time and with repeated cycles of charging and discharging. Accordingly, it is desirable to maintain a healthy battery condition by monitoring the loads on the battery and selectively electrically connecting and/or disconnecting such loads under certain operating conditions.

SUMMARY

According to one aspect, a battery control system for a vehicle is provided. More particularly, in accordance with this aspect, the battery control system includes a battery for supplying electrical power in the vehicle. A controller receives a battery signal representative of a condition of the battery, an ignition key signal representative of a state of an ignition key of the vehicle, and an engine signal representative of a state of an internal combustion engine in the vehicle. At least one load is selectively connected to the battery by the controller in response to at least one of the battery signal, the ignition key signal and the engine signal. An interface provides information on at least one of the battery and a connection state between the at least one load and the battery.

According to another aspect, a battery control method is provided for a battery of a vehicle that provides electrical power to a plurality of loads of the vehicle. More particularly, in accordance with this aspect, a battery signal representative of a condition of the battery is received. An ignition key signal representative of a state of an ignition key of the vehicle is also received, along with an engine signal representative of a state of an internal combustion engine of the vehicle. The plurality of loads of the vehicle are selectively electrically connected to the battery based on at least one of the battery signal, the ignition key signal and the engine signal. Information on at least one of the battery and a connection state between at least one of the plurality of loads and the battery is provided.

According to yet another aspect, a control system for a battery in a vehicle is provided. More particularly, in accordance with this aspect, the control system includes a battery for supplying electrical power in the vehicle. A controller receives a battery signal representative of a condition of the battery, an ignition key signal representative of a state of an ignition key of the vehicle, and an engine signal representative of a state of an engine in the vehicle. A plurality of loads is selectively electrically disconnected from the battery by the controller in response to the battery signal, the ignition key signal and the engine signal. The controller electrically disconnects a load A1 of the plurality of loads when the ignition key signal indicates that the ignition key is not in an ON position and the battery signal indicates the condition of the battery to be below a threshold A1. The controller electrically disconnects a load A1+N of the plurality of loads from the battery when the ignition key signal indicates that the ignition key is not in the ON position and the battery signal indicates that the condition of the battery is below a threshold A1+N. The threshold A1+N is lower than the threshold A1. An interface provides a message A1 when the load A1 is electrically disconnected from the battery and provides a message A1+N when the load A1+N is electrically disconnected from the battery.

DETAILED DESCRIPTION

Figure 1:
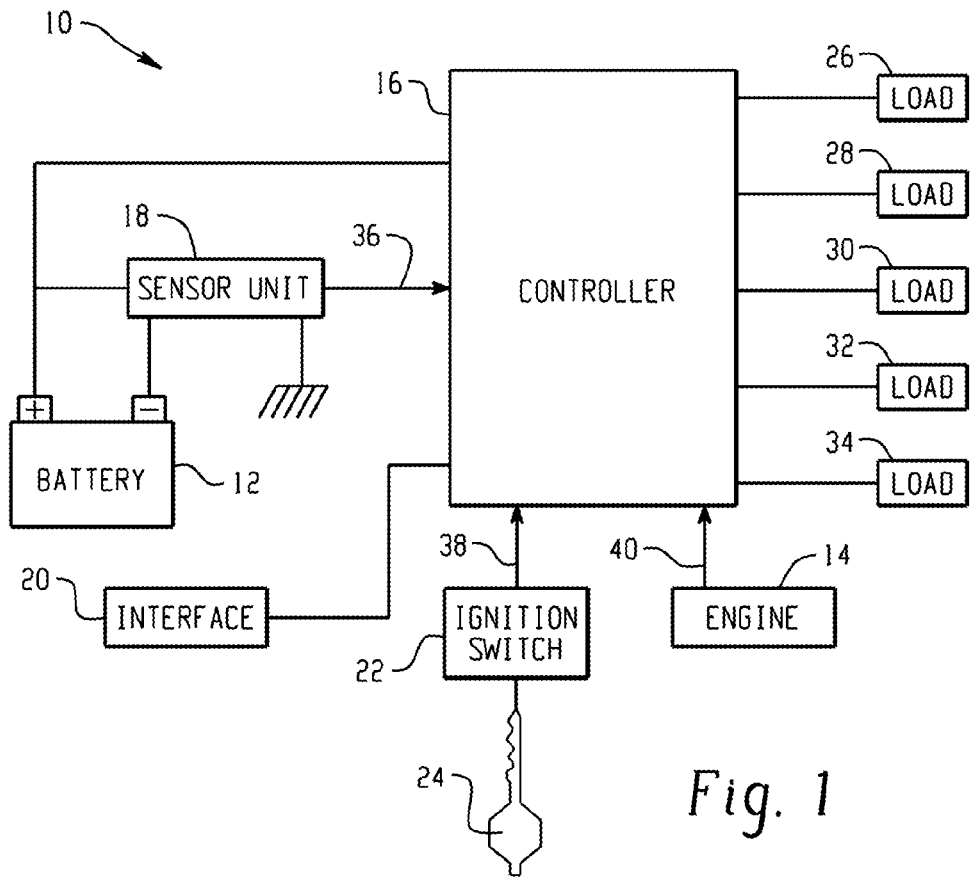
FIG. 1 is schematic view of a battery control system for a vehicle.

Referring now to the drawings, wherein the showings are for purposes of illustrating one or more exemplary embodiments, FIG. 1 shows a battery control system 10 for a vehicle. In the illustrated embodiment, the battery control system 10 includes a battery 12 for supplying electrical power in the vehicle. Battery 12 can be a conventional battery, such as a 12 V battery, used to power a vehicle having an engine 14 (e.g., an internal combustion engine). The control system 10 can further include a controller 16 powered and/or linked to the battery 12. As used herein, a link or being linked is used broadly to cover any operative connection between components of the system 10 whether wired or wireless that enables the linked components to communicate (e.g., transmit a signal from one component to another). Though the controller 16 of FIG. 1 is schematically shown as a central controller, it is to be appreciated by those skilled in the art that the controller 16 could be distributed throughout the system 10 or vehicle in which the system 10 is disposed.

As is known and understood by those skilled in the art, the controller 16 can be implemented by a microcomputer comprised of a CPU, a ROM for storing various operating programs or modules to be executed by the CPU, a RAM for storing the results of computations or the like by the CPU and any number of input/output interfaces, none of which is shown in FIG. 1. In addition to coordinating operation of the system 10, the controller 16, whether centralized or distributed, can store data obtained about the condition of the battery 12 for future diagnostic review (e.g., battery data stored by the controller 16 can be reviewed when the battery loses all of its charge and/or its ability to hold a sufficient charge). The control system 10 can further include a sensor unit 18 and an interface 20, both of which can be linked to the controller 16. The system 10 can also include an ignition switch or device 22 linked to the controller 16 for use in association with a key 24, which can be a conventional cut key, an electronic key or the like. As will be described in more detail below, the battery control system 10 includes at least one load, a plurality of loads 26, 28, 30, 32, 34 in the illustrated embodiment, that is selectively electrically connected/disconnected to the battery 12 by the controller 16. As will also be described in more detail below, the interface 20 provides information (e.g., audio and/or video information) on at least one of the battery 12 and a connection state between at least one of the loads 26-34 and the battery 12.

The controller 16 receives a battery signal 36 representative of a condition of the battery 12 from the sensor unit 18. The controller 16 also receives an ignition key signal 38 from the ignition switch or device 22 that is representative of a state of the ignition key 24 of the vehicle (e.g., the ignition key 24 is either in an ON position or in a key OFF or key REMOVED position). The controller 16 can further receive an engine signal 40 from the engine 14 representative of a state of the engine 14 (i.e., indicating that the engine is running or is off). Using at least one of these signals 36, 38, 40, the controller 16 can selectively electrically connect or disconnect one or more of the loads 26-34 from the battery 12. In one embodiment that will be described in more detail below, one or more of the loads 26-34 is electrically disconnected from the battery 12 in response to the battery signal 36, the ignition key signal 38, and the engine signal 40.

In the illustrated embodiment, the sensor or sensor unit 18 is electrically connected to the battery 12 for determining the condition of the battery 12 and generating the battery signal representative thereof to send to the controller 16. The battery signal 36 can be one or more signals that indicate the condition of the battery 12. The condition can be a state of charge (SOC), such as a value indicating the charge remaining in the battery 12 relative to a scale ranging between a low end where no charge remains in the battery 12 and a high end where the battery 12 is fully charged (or overcharged). In addition, or in the alternative, the condition of the battery 12 can be a state of function (SOF) of the battery, such as an indication or value indicative of the cranking ability of the battery, the battery's cranking voltage, the battery's health or state or the like. For example, the sensor unit 18 could determine that the battery 12 lacks sufficient energy capacity or output capability to start the engine 14 and the signal 36 sent to the controller 16 could be representative of this indication. In one embodiment, the signal 36 indicates the condition of the battery as relates to its overall state of charge (i.e., a value or percentage of a maximum state of charge of the battery 12) and an indication of the cranking ability of the battery 12. In one exemplary embodiment, the state of charge is the percentage of maximum electrical energy output of the battery 12 and the cranking ability is the percent state of charge required to start the engine, which can vary by temperature and other external factors.

The loads 26-34 can be various electrical consuming devices or groups of devices within the vehicle. For example, first load 26 can be interior lighting within the vehicle and second load 28 can be backup functions (+B functions) of the vehicle. The remaining loads 30, 32, 34 can be, for example, headlights, windshield wipers, the entertainment or sound system, rear defogger, various customer accessories, trunk lights, navigational systems and displays or other displays (e.g., a rear entertainment screen), heated seats, ventilation blower, etc. Though the illustrated battery control system 10 is shown with loads 26-34, it is to be appreciated and understood by those skilled in the art that any number of loads could be selectively electrically connected by the controller 16 to the battery 12.

Figure 2:
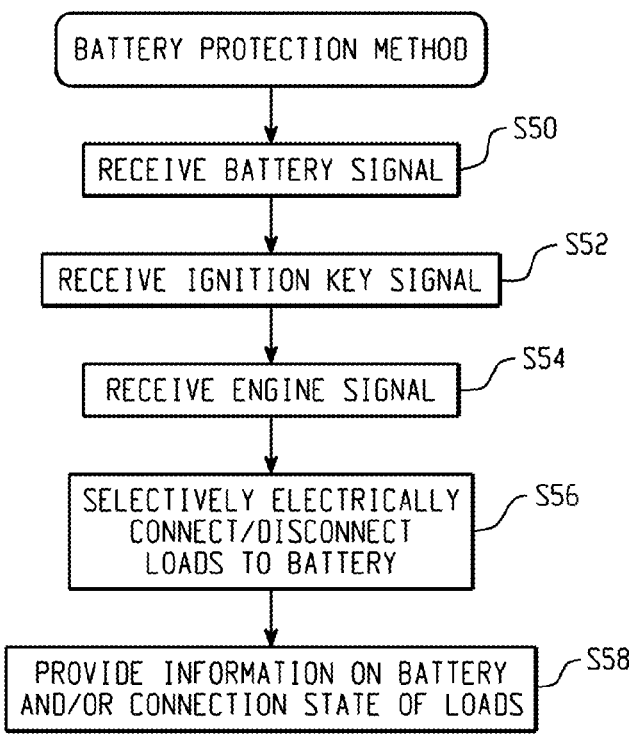
FIG. 2 is a block diagram illustrating a battery control method for a battery of a vehicle that provides electrical power to a plurality of loads of the vehicle.

With additional reference to FIG. 2, an exemplary battery protection or control method will now be described in association with the illustrated system 10 of FIG. 1. In the method, the controller 16 receives the battery signal 36 that is representative of the condition of the battery 12 (step S50). The controller 16 also receives the ignition key signal 38 (step S52) that is representative of the state of the ignition key 24 (i.e., in the ON position or in the OFF or REMOVED position) and receives the engine signal 40 (step S54) representative of the state of the engine 14 (e.g., the state can either be on and running or off). Using at least one of the signals 36, 38, 40, (and using all of the signals 36-40 in one exemplary embodiment), the controller 16 selectively electrically connects/disconnects the loads 26-34 of the vehicle relative to the battery 12 (step S56). The controller 16 can also provide information on the interface 20 on at least one of the battery 12 (e.g., the condition of the battery) and/or a connection state between one or more of the loads 26-34 and the battery 12 (step S58). For example, the interface 20 can include a display or display portion for displaying said information. Alternatively, or in addition, the interface can include an audio or alarm producing device for providing audio or an alarm.

Figure 3:
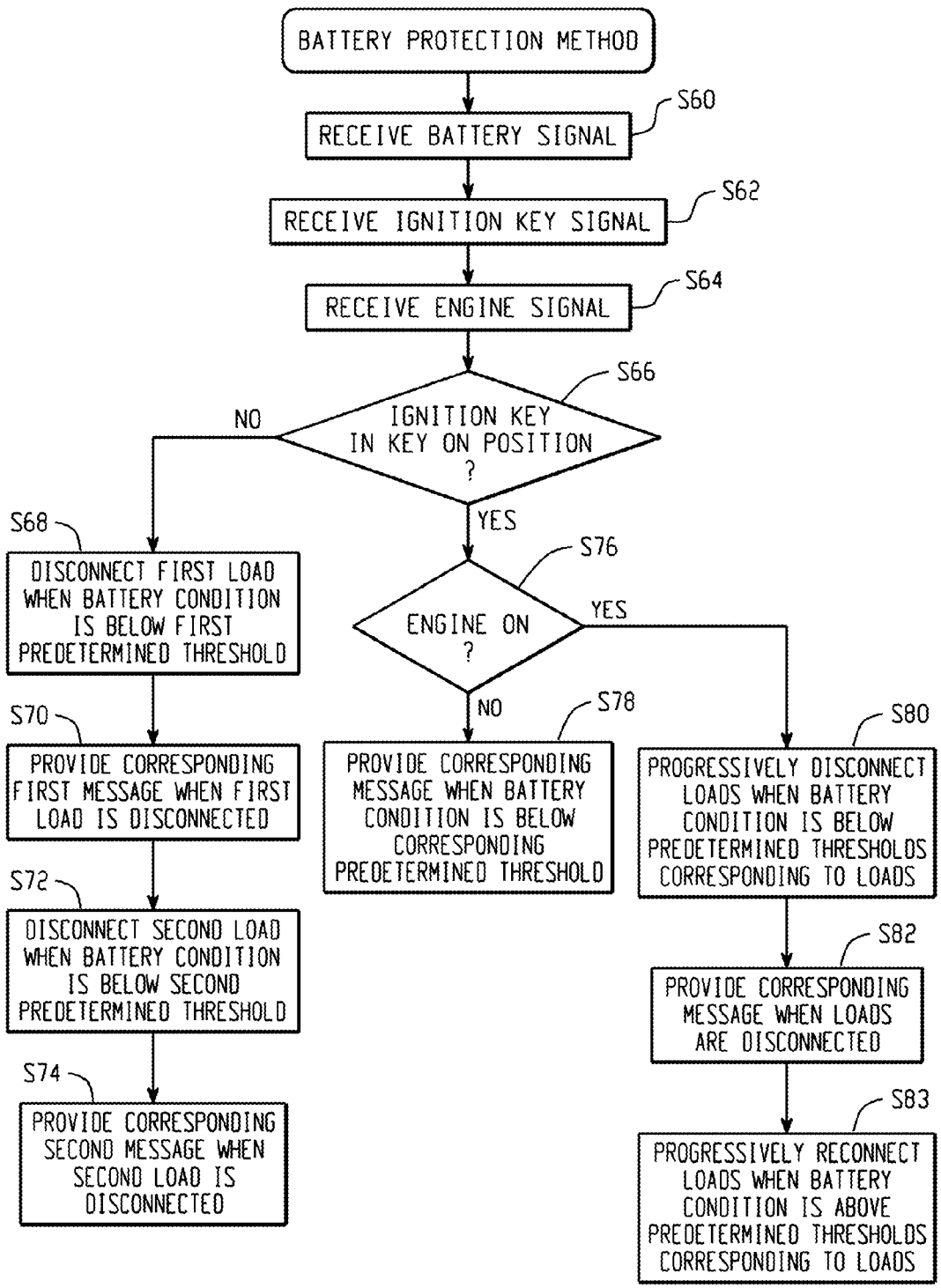
FIG. 3 is another block diagram illustrating a battery control method for the battery of a vehicle.
Figure 5A:
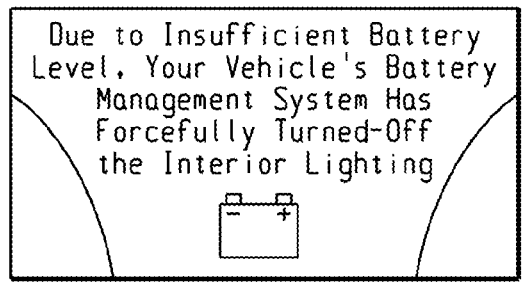
FIGS. 5a-5c illustrate various notifications or messages that can be provided to a vehicle operator to indicate a condition of the vehicle's battery and/or a connection state between one or more loads on the battery and the battery itself.

Turning to FIG. 3, the battery protection or control method is shown in further detail according to one exemplary embodiment. More particularly, the illustrated method of FIG. 3 includes receiving the battery signal 36, the ignition key signal 38, and the engine signal 40 (steps S60, S62, S64) but illustrates the steps S56 and S58 of FIG. 2 in further detail. More particularly, for selectively electrically connecting/disconnecting the loads 26-34 and the battery 12, the controller determines if the ignition key 24 is in the key ON position (step S66). If the ignition key 24 is not in the key ON position, the controller 16 electrically disconnects the first load 26, which can be interior lighting within the vehicle for example, from the battery when the battery signal 36 indicates the condition of the battery 12 is below a first predetermined threshold (e.g., such as below 80% of a full charge) (step S68). The controller 16 then commands the interface 20 to provide a first message when the first load 26 is electrically disconnected from the battery 12 (step S70). The first message can be an indication (e.g., a visual and/or an audio indication) that the first load 26 has been disconnected from the battery 12. For example, with reference to FIG. 5A, an example first message is shown wherein the load 26 is interior lighting of the vehicle that has been disconnected from the battery 12. The example first message could be provided alone or with audio (e.g., an alarm).

Figure 5B:
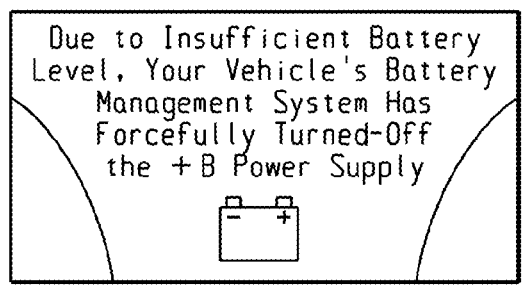

Next, the controller 16 can electrically disconnect the second load 28, which can be backup functions of the vehicle (i.e., +B functions), when the ignition key signal 38 indicates that the ignition key 24 is in the key OFF position in step S66 and the battery signal 36 indicates that the condition of the battery 12 is below a second predetermined threshold (e.g., below 60% of full charge), wherein the second predetermined threshold is lower than the first predetermined threshold (step S72). Thus, the first predetermined threshold used in step S68 is associated or corresponds with the first load 26 and the second predetermined threshold used in step S72 is associated or corresponds with the second load 28. The controller 16 then commands the interface 20 to provide a second message when the second load 28 is electrically disconnected from the battery 12 (step S74). The second message can indicate (e.g., a visual and/or an audio notification) that the second load 28 has been disconnected from the battery 12. With reference to FIG. 5b, an example second message is shown wherein the second load 28 is the backup function or +B power supply of the vehicle that has been disconnected from the battery 12. Like the example first message, the second message could be provided alone or with audio (e.g., another alarm).

Figure 5C:
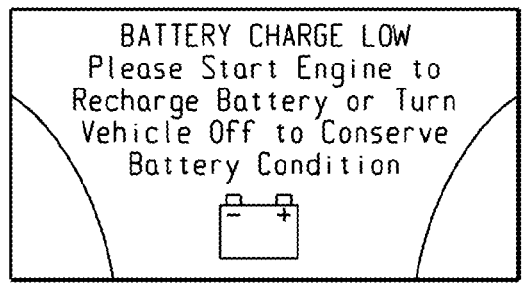

Should a determination be made in step S66 that the ignition key 24 is in the key ON position, a second determination is made to determine whether the engine 14 is on or running (step S76). Using the method illustrated in FIG. 3, the controller 16 commands the interface 20 to provide a message (step S78) when the ignition key signal 38 indicates that the ignition key 24 is in the ON position (in step S66), the engine signal 40 indicates that the engine 14 is off, and the battery signal 36 indicates that the condition of the battery 12 is below a predetermined threshold (e.g., 75% of a fully charged battery). Again, the message can be a visual and/or an audio message (e.g., a visual display accompanied by an alarm). This predetermined threshold, which is associated with the ignition key 24 being in the ON position and the engine being OFF, can be the same or different than the predetermined thresholds of steps S68 and S72. The message provided in step S78 can indicate that the condition of the battery 12 is below the predetermined threshold associated or corresponding with step S78. With reference to FIG. 5c, in one exemplary embodiment, the message in step S78 can be a visual message as illustrated. This example message could be provided alone or with audio (e.g., an alarm).

When the ignition key 24 is in the key ON position, as determined in step S66, and the engine 14 is on, as determined in step S76, the controller 16 can progressively disconnect each of the loads 26-34 (or a subset thereof) when the battery signal 36 indicates that the condition of the battery 12 is below a predetermined threshold that corresponds specifically to each of the loads 26-34 (step S80). As the loads are progressively disconnected in step S80, corresponding messages can be provided when the loads are disconnected (step S82), though this is not required. Like the other messages, these messages can be visual and/or audio messages. The predetermined threshold or thresholds corresponding to each of the loads 26-34 (and thus the messages) can be set or prioritized based on one or more predetermined factors. For example, the prioritization of the loads 26-34 can be based on regulations, importance to the customer, and/or energy or power usage, etc. In the system 10, these and other factors can be used to determine an importance consideration for a load or a group of loads. The importance consideration can be, for example, a valve or position assigned to a load or group of loads that prioritizes or ranks the load or group of loads relative to other loads or groups of loads.

Figure 6:
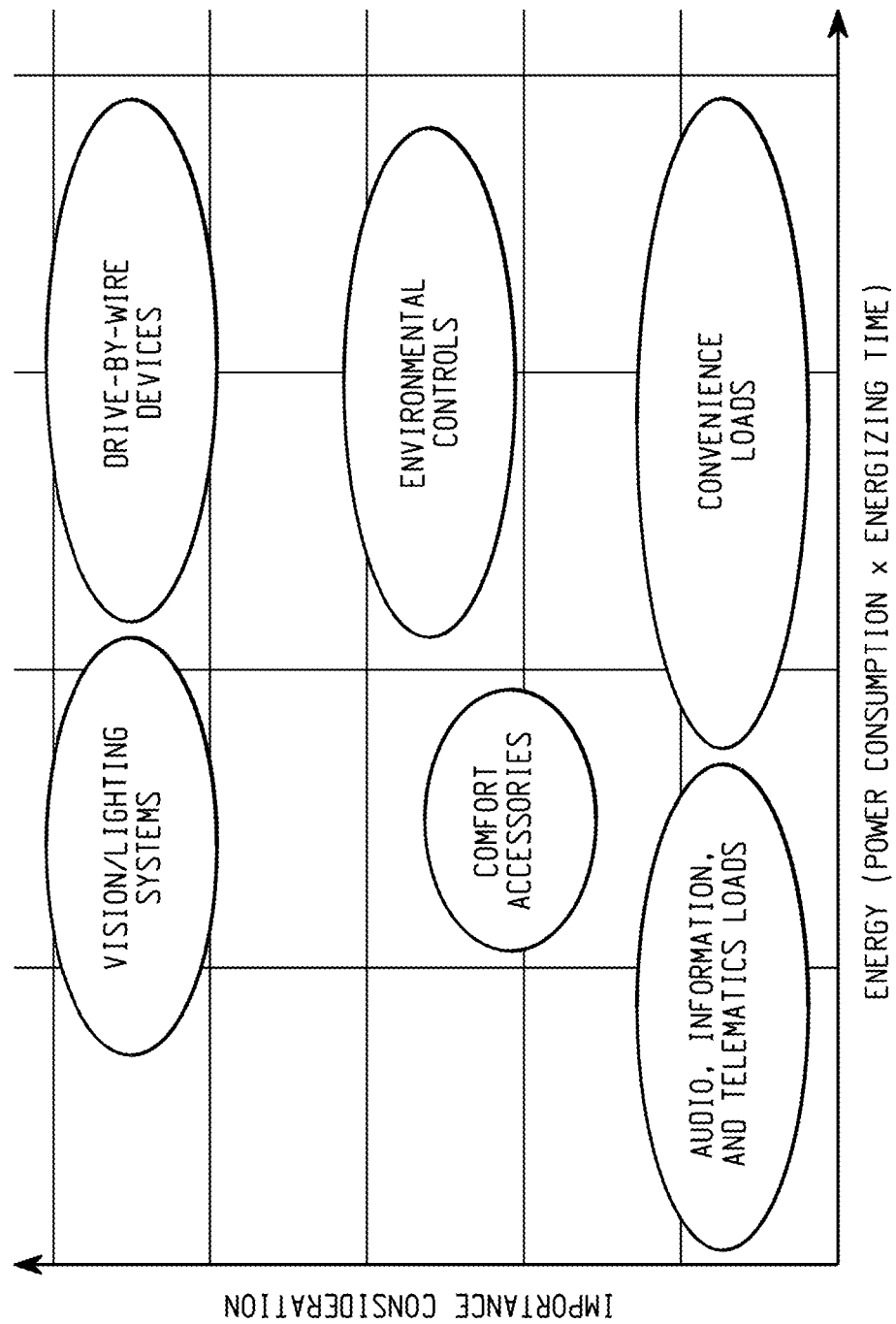
FIG. 6 is an exemplary diagram showing the prioritization of various loads on a vehicle's battery.

More particularly, and with additional reference to FIG. 6, the loads or groups of loads of the vehicle can be prioritized due to an assigned importance consideration versus energy consumption (i.e., power consumption×energized time). Thus, for example, a comfort accessory load which may have a relatively lower assigned importance consideration could have its threshold set so as to be electrically disconnected prior to a visual lighting system load, which may use approximately the same amount of energy but have a higher assigned importance consideration. As a further example, a convenience load could have a threshold set so as to be disabled sooner than a telematics load because, while being shown as having similar importance considerations, the convenience load may require more energy. Alternatively, some loads (e.g., vision/lighting systems and drive-by-wire devices) which may have a relatively higher importance consideration, could be removed from the system 10 so as to prevent being electrically disconnected from the battery 12 by the controller 16 or could have a threshold that is very low and is only met when the condition of the battery 12 is critical (e.g., just above a point where the engine can still be started).

With reference back to FIG. 1, the progressive electrical disconnection of the loads 26-34 from the battery 12 (i.e., step S80) will be described in a particular example. In this example, each of the loads 26-34 is associated or corresponds to a particular threshold (at least for step S80). Accordingly, the threshold for each load 26-34 is set so as to determine when the load 26-34 is electrically disconnected from the battery 12 based on the condition of the battery 12. In this example, the controller 16 could electrically disconnect the first load 26 from the battery 12 when the battery signal 36 indicates that the condition of the battery 12 is below a first predetermined threshold corresponding to the load 26 (e.g., 85% of full charge) and a corresponding message could be provided on the interface 20. Similarly, the second load 28 can be electrically disconnected from the battery 12 by the controller 16 when the battery signal 36 indicates that the condition of the battery 12 is below a second predetermined threshold that corresponds to the second load 28 (e.g., 75% of full charge) and another corresponding message could be provided on the interface 20. The additional loads 30-34 can then each, in turn, have an associated or corresponding predetermined threshold (e.g., 60% of full charge for load 30, 50% of full charge for load 32, and 20% of full charge for load 34).

In this manner, the controller 16 can progressively electrically disconnect the loads 26-34 from the battery 12 as the battery signal 36 indicates the condition of the battery 12 to be below each of the thresholds associated with the loads 26-34. Again, it is to be appreciated that the progressive electrical disconnection of loads 26-34 in step S80 occurs when the battery signal 36 indicates that the condition of the battery 12 is below each threshold associated with each load 26-34 and the ignition key signal 38 indicates that the ignition key 24 is in the key ON position (step S66) and the engine signal 40 indicates that the engine 14 is on (step S76). Through the progressive electrical disconnection of the loads 26-34 from the battery 12 by the controller 16, the condition of the battery 12 can be preserved or at least extended. Moreover, the decreasing condition of a battery 12 can be used to continue to electrically power only the loads of the vehicle having more important considerations.

Optionally, the controller can progressively reconnect any of the loads 26-34 (or a subset thereof) after disconnection in step S80 when the battery signal 36 indicates that the condition of the battery is above a predetermined threshold that corresponds specifically to each of the disconnected loads 26-34 (step S83). If desirable, the progressive reconnection of step S83 can use the same thresholds as used in step S80, though this is not required. For example, if load 26 is disconnected from the battery 12 when the battery signal 36 indicates that the condition of the battery is below a first predetermined threshold (e.g., 85% of full charge), the load 26 can be reconnected to the battery 12 when the battery signal 36 indicates that the condition of the battery returns above the first predetermined threshold. Of course, however, the reconnection of loads in step S83 could alternately use different thresholds than used in step S80 and such different thresholds can be established independently of those used in step S80 from the same factors and/or some other factors relating to prioritization of the loads. In addition, all loads, such as loads 26-34 can be reconnected to the battery 12 when a particular condition is met. For example, the condition could be cycling of the ignition key from its ON position to its OFF position and back to its ON position, or the condition could be some other resetting means (e.g., a reset button).

Figure 4:
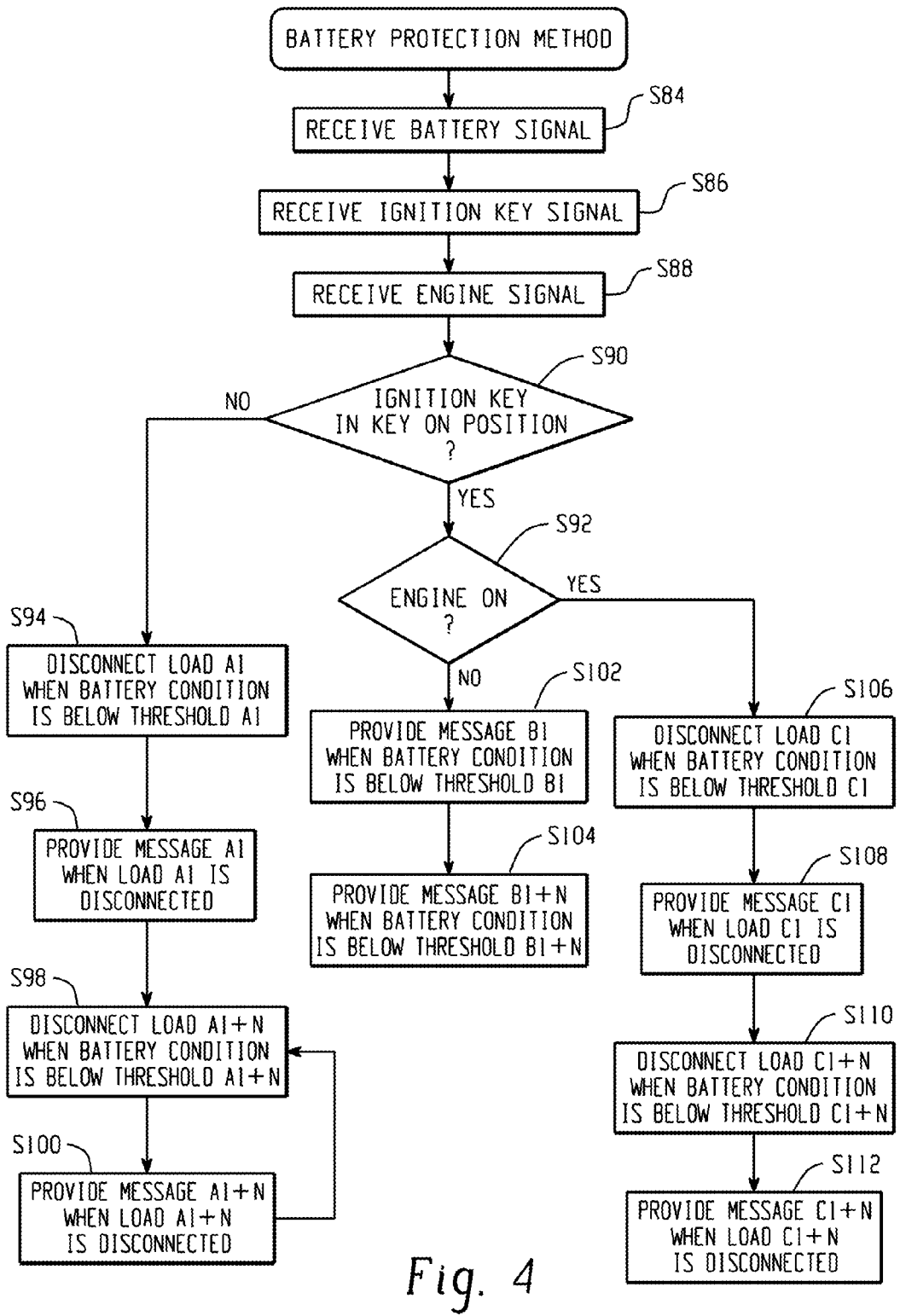
FIG. 4 is still another block diagram illustrating a battery control method for the battery of a vehicle.

With reference now to FIG. 4, a battery protection or control method is shown according to an alternate embodiment. More particularly, the battery protection method of FIG. 4 is similar to that depicted in FIG. 3, but allows for any number of loads to be progressively disconnected when the ignition key is not in the ON position, allows any number of messages to be displayed as the battery condition deteriorates when the ignition key is in the ON position and the engine is not running, and continues to allow progressive electrical disconnection and reconnection of the loads from the battery when the ignition key is in the ON position and the engine is on.

More specifically, the battery protection method depicted in FIG. 4 can be used in association with the control system of FIG. 1. Thus, in steps S84, S86, and S88, the controller 16 receives the battery signal 36, the ignition key signal 38, and the engine signal 40. Like steps S66 and S76 in FIG. 3, the method of FIG. 4 includes steps S90 and S92 for, respectively, determining if the ignition key 24 is in the key ON position and if the engine 14 is ON. When the ignition key 24 is not in the key ON position, as determined in step S90, selected loads can be progressively disconnected electrically from the battery 12.

More particularly, a load A1 can be electrically disconnected from the battery 12 when the battery condition is below a corresponding threshold A1 (step S94). The load A1 can be any one of the loads selectively electrically connected to the battery 12 by the controller 16. The threshold A1 can be a threshold that particularly corresponds to the selected load A1 and can be set for electrically disconnecting load A1 under the condition that the ignition key 24 is not in the key ON position. Next, in step S96, a message A1 can be provided when the load A1 is electrically disconnected. The message A1, which can be a visual and/or audio message, can be specific to the condition of load A1 being disconnected due to the battery condition being below threshold A1 when the ignition key 24 is not in the key ON position.

This sequence can be repeated for any number of loads, as desired. Thus, in step S98 a load A1+N can be electrically disconnected from the battery 12 when the battery condition is below a threshold A1+N that corresponds to the load A1+N. The load A1+N can be any load selectively electrically connected to the battery 12 by the controller 16, other than load A1. A message A1+N can be provided when the load A1+N is disconnected due to the battery condition falling below the corresponding threshold A1+N (step S100). This sequence of disconnecting a load when the battery condition is below a corresponding threshold and providing a corresponding message can be repeated for any number of additional loads as desired (i.e., N can be indexed upward as desired and steps S98 and S100 repeated as necessary).

When determined that the ignition key 24 is in the key ON position in step S90 and determined that the engine 14 is off in step S92, messages (e.g., visual and/or audio messages) can be progressively provided as the battery condition falls below a series of thresholds (step S102). For example, a message B1 can be provided when a battery condition falls below threshold B1. The threshold B1 can be the same as any of the thresholds A1 or A1+N, or can be some other threshold. This sequence can then be repeated for any number of additional messages corresponding to additional thresholds. For example, in step S104, a message B1+N can be displayed when the condition of battery 12 is below a corresponding threshold B1+N. Then, N can be indexed upward as desired and step S104 repeated.

When the ignition key 24 is in the key ON position as determined in step S90 and the engine 14 is on as determined in step S92, loads selectively electrically connected to the battery 12 by the controller 16 can be progressively disconnected as the battery condition falls below thresholds associated with each of the loads (step S106). For example, in step S106, load C1 can be electrically disconnected from the battery 12 when the battery condition falls below corresponding threshold C1. When load C1 is disconnected, a message C1 can be provided (step S108) to indicate that load C1 has been disconnected. Like the other messages, the message C1 can be a visual and/or an audio message (e.g., a text display and/or an audio alarm). Then, should the battery condition further deteriorate, a load C1+N can be electrically disconnected from the battery 12 when the battery condition falls below a corresponding threshold C1+N (step S110). When load C1+N is disconnected, a message C1+N can be provided (step S112) to indicate that load C1+N has been disconnected. This sequence can be repeated for any number of loads having corresponding thresholds (i.e., N can be indexed upward for however many loads and corresponding thresholds are desired). Though not shown, the loads C1 and C1+N can be reconnected to the battery as its condition improves in some manner as described in reference to step S83 of FIG. 3, though this is not required.

Also, the loads C1 and C1+N and corresponding thresholds C1 and C1+N can be the same or different than the loads A1 and A1+N and corresponding thresholds A1 and A1+N. That is, the loads and thresholds of steps S106 and S108 need not be the same or ordered the same as the loads in corresponding thresholds in the steps S94-S100. For example, load A1 can correspond to load 26 in FIG. 1 and have a threshold A1 set at 80% of full charge. Load A1+N could then correspond to load 28 and have a corresponding threshold A1+N that is 60% of full charge of the battery 12. Load C1, however, could correspond to load 30 and threshold C1 could be set at 85% of full charge of the battery 12 and load C1+N could be set as load 26 and threshold C1+N could be set as 60% of full charge of the battery 12. In this manner, the selective electric disconnection of the loads 26-34, or any other loads, from the battery 12 can be optimized differently for the condition where the ignition key 24 is not in the key ON position than for the conditions where the ignition key is in the key ON position and the engine is on.

While one or more of the various embodiments have been described herein with reference to the battery's SOC, it is to be appreciated that SOC is merely an exemplary parameter that is sensed, measured and/or otherwise determined and accordingly used in one or more suitable manners as explained above. More generally and/or in alternate embodiments, other parameters indicative of and/or related to the battery's state of function (SOF) may similarly be obtained (i.e., sensed, measured and/or otherwise determined) and suitably used in place of the SOC. In this regard, examples of the battery's SOF include not only the battery's SOC but also the battery's cranking voltage, the internal resistance of the battery, the battery's reserve capacity, the cold cranking amperes (CCA) of the battery, the battery's health and the like. Accordingly, it is intended that the terms and/or parameters SOC and SOF when used herein may optionally be interchanged where appropriate to achieve various alternate embodiments suitable for particular desired applications.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. For example, the sensor 18 and controller 16 may suitably be integrated together. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. For example, the controller 16 and/or sensor 18 may be implemented as appropriate hardware circuits or alternately as microprocessors programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternatives thereof, may be desirably combined into many other different systems or applications (e.g., electrically or fuel cell powered vehicles). Also that various presently unforeseen or unanticipated alternatives, modifications, variations or improvements therein may be subsequently made by those skilled in the art which are also intended to be encompassed by the following claims.

The invention claimed is:

1. A battery control system for a vehicle, comprising:
a battery for supplying electrical power in the vehicle;
a controller receiving a battery signal representative of a condition of said battery, an ignition key signal representative of a state of an ignition key of the vehicle, and an engine signal representative of a state of an internal combustion engine in the vehicle;
a plurality of loads selectively electrically connected to said battery by said controller in response to at least one of said battery signal, said ignition key signal and said engine signal; and
an interface providing information on at least one of said battery and a connection state between said plurality of loads and said battery,
wherein said controller electrically disconnects at least one load of said plurality of loads from said battery when said controller receives (i) said ignition key signal indicating that said ignition key is not in an ON position and (ii) said battery signal indicating that said condition of said battery is below a first predetermined threshold.

2. The battery control system of claim 1 wherein said at least one load of said plurality of loads includes a first load, and wherein said controller electrically disconnects a second load of said plurality of loads from said battery when (i) said ignition key signal indicates that said ignition key is not in said ON position and (ii) said battery signal indicates that said condition of said battery is below a second predetermined threshold, said second predetermined threshold being lower than said first predetermined threshold.

3. The battery control system of claim 2 wherein said first load is interior lighting within the vehicle and said second load is backup functions of the vehicle.

4. The battery control system of claim 2 wherein said controller commands said interface to provide a first message when said first load is electrically disconnected from said battery and commands said interface to provide a second message when said second load is electrically disconnected from said battery, said first message indicating that said first load has been disconnected from said battery and said second message indicating that said second load has been disconnected from said battery.

5. The battery control system of claim 1 further including a sensor electrically connected to said battery for sensing said condition of said battery and generating said battery signal to send to said controller.

6. The battery control system of claim 1 wherein said controller commands said interface to provide a message when (i) said ignition key signal indicates that said ignition key is in an ON position, (ii) said engine signal indicates that said engine is off, and (iii) said battery signal indicates that said condition of said battery is below a predetermined threshold, said message indicating that said condition of said battery is below said predetermined threshold.

7. The battery control system of claim 1 wherein said at least one load of said plurality of loads a first load, wherein said controller electrically disconnects the first load from said battery when (i) said ignition key signal indicates that said ignition key is in an ON position, (ii) said engine signal indicates that said engine is on, and (iii) said battery signal indicates that said condition of said battery is below the first predetermined threshold, and wherein said controller electrically disconnects a second load of said plurality of loads from said battery when (i) said ignition key signal indicates that said ignition key is in said ON position (ii) said engine signal indicates that said engine is on, and (iii) said battery signal indicates that said condition of said battery is below a second predetermined threshold that is lower than said first predetermined threshold.

8. The battery control system of claim 1 wherein said controller progressively disconnects each of said plurality of loads when (i) said ignition key signal indicates that said ignition key is in an ON position, (ii) said engine signal indicates that said engine is on, and (iii) said battery signal indicates that said condition of said battery is below a predetermined threshold that corresponds specifically to each of said plurality of loads.

9. The battery control system of claim 8 wherein said controller progressively reconnects each of said plurality of loads after being disconnected when (i) said ignition key signal indicates that said ignition key is in an ON position, (ii) said engine signal indicates that said engine is on, and (iii) said battery signal indicates that said condition of said battery is above said predetermined threshold that corresponds specifically to each of said plurality of loads.

10. The battery control system of claim 8 wherein said predetermined threshold corresponding to each of said plurality of loads is prioritized based on at least one of customer importance and energy or power consumption.

11. A battery control method for a battery of a vehicle that provides electrical power to a plurality of loads of the vehicle, comprising:
receiving a battery signal representative of a condition of the battery;
receiving an ignition key signal representative of a state of an ignition key of the vehicle;
receiving an engine signal representative of a state of an internal combustion engine of the vehicle;
selectively electrically connecting the plurality of loads of the vehicle to the battery based on at least one of said battery signal, said ignition key signal and said engine signal;
providing information on at least one of the battery and a connection state between at least one of the plurality of loads and the battery; and
electrically disconnecting at least one load of said plurality of loads from the battery when said ignition key signal indicates that said ignition key is in an OFF position and said battery signal indicates said condition of the battery is below a first predetermined threshold.

12. The battery control method of claim 11 wherein the plurality of loads of the vehicle are selectively electrically connected to the battery based on said battery signal, said ignition key signal and said engine signal.

13. The battery control method of claim 11 further comprising:
electrically disconnecting a second load of the plurality of loads from the battery when said ignition key signal indicates that said ignition key is in said OFF position and said battery signal indicates said condition of the battery is below a second predetermined threshold.

14. The battery control method of claim 13 wherein providing information includes:
displaying a first message indicating that said first load has been disconnected from the battery when said first load is electrically disconnected from the battery; and
displaying a second message indicating that said second load has been disconnected from the battery when said second load is electrically disconnected from the battery.

15. The battery control method of claim 11 wherein providing information includes providing a message indicating that said condition of the battery is below a predetermined threshold when said ignition key signal indicates that said ignition key is in an ON position, said engine signal indicates that the engine is off, and said battery signal indicates that said condition of the battery is below said predetermined threshold.

16. The battery control method of claim 11 wherein selectively electrically connecting the plurality of loads includes progressively electrically disconnecting each of the plurality of loads when said ignition key signal indicates that said ignition key is in an ON position, said engine signal indicates that said engine is on, and said battery signal indicates that that said condition of said battery is below a predetermined threshold that corresponds specifically to each of the plurality of loads.

17. The battery control method of claim 16 wherein progressively electrically disconnecting each of the plurality of loads includes prioritizing each of the loads based on at least one of regulations, customer importance, energy consumption and power consumption.

18. A control system for a battery in a vehicle, comprising:
a battery for supplying electrical power in the vehicle;
a controller receiving a battery signal representative of a condition of said battery, an ignition key signal representative of a state of an ignition key of the vehicle, and an engine signal representative of a state of an engine in the vehicle;
a plurality of loads selectively electrically disconnected from said battery by said controller in response to said battery signal, said ignition key signal and said engine signal, said controller electrically disconnecting a load A1 of said plurality of loads when said ignition key signal indicates that said ignition key is not in an ON position and said battery signal indicates said condition of said battery is below a threshold A1 and said controller electrically disconnecting a load A1+N of said plurality of loads from said battery when said ignition key signal indicates that said ignition key is not in said ON position and said battery signal indicates that said condition of said battery is below a threshold A1+N, said threshold A1+N being lower than said threshold A1; and
an interface providing a message A1 when said load A1 is electrically disconnected from said battery and providing a message A1+N when said load A1+N is electrically disconnected from said battery,
wherein N is an integer.

19. The control system of claim 18 wherein said interface provides a message B1 when said ignition key signal indicates that said ignition key is in an ON position, said engine signal indicates that said engine is off, and said battery signal indicates that said condition of said battery is below a threshold B1.

20. The control system of claim 19 wherein said controller electrically disconnects a load C1 when said ignition key signal indicates that said ignition key is in an ON position, said engine signal indicates that said engine is on, and said battery signal indicates that that said condition of said battery is below a threshold C1, and said controller electrically disconnects a load C1+N when said ignition key signal indicates that said ignition key is in an ON position, said engine signal indicates that said engine is on, and said battery signal indicates that that said condition of said battery is below a threshold C1+N, said threshold C1+N being lower than said threshold C1.

* * * * *